United States Patent Office 2,958,833
Patented Nov. 1, 1960

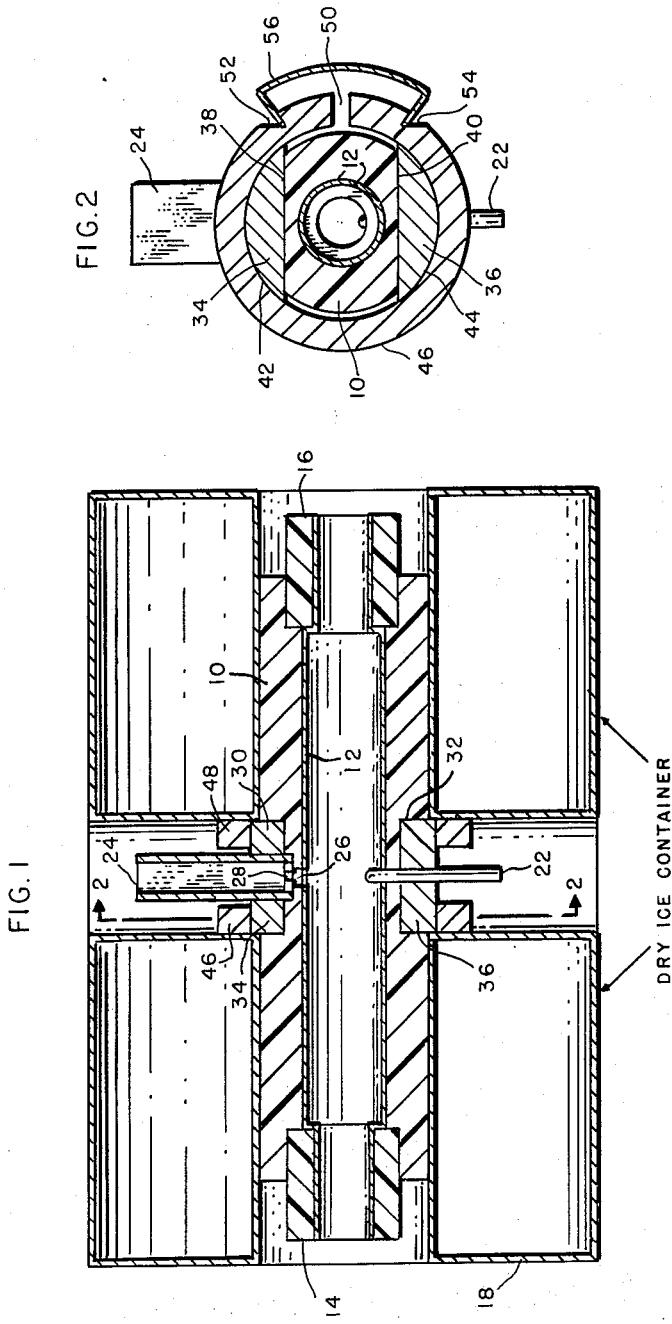

2,958,833

STABILIZATION OF MICROWAVE RESONATORS

Friedrich O. Vonbun and Gernot M. R. Winkler, Long Branch, N.J., assignors to the United States of America as represented by the Secretary of the Army Filed Feb. 28, 1958, Ser. No. 718,381

8 Claims. (Cl. 333—83)

(Granted under Title 35, U.S. Code (1952), sec. 266)

The invention described herein may be manufactured and used by or for the Government for governmental purposes, without the payment of any royalty thereon.

The present invention relates to stabilization of the dimensions of structures, particularly of microwave cavity resonators such as used in oscillators operating at the transition frequency of molecular particles, e.g., the maser.

In the maser oscillator, molecular transition from a higher to a lower energy state, which give rise to microwave oscillations, take place in a cavity resonator which must be tuned as closely as possible to the transition frequency. Any departure from this relationship will cause a pulling effect on the output frequency of the oscillator. It follows, therefore, that to make such oscillators useful as a primary frequency standard, the dimensions of the cavity resonator must be maintained as constant as possible.

The cavities of such oscillators, which are usually made of metal, must be kept at substantially constant temperature to prevent frequency drift. But heretofore, such control had to be maintained within extremely close tolerances, e.g., within a minute fraction of one degree, requiring elaborate equipment capable of maintaining such control over a wide range of temperatures. Such elaborate equipment is not only expensive, it is also too cumbersome and fragile for use with portable equipment.

It is a principal object of the present invention to provide a novel structure, such as a cavity resonator, which need not be a temperature controlled to as high a degree.

It is a further object of the invention to provide a novel means for coupling a metal waveguide to such a cavity resonator to provide a more uniform degree of coupling in spite of differences in expansion coefficients and other mechanical characteristics of the materials used.

In accordance with the invention, the first of the above objects is attained by making the cavity of a material which has a coefficient of expansion which changes from positive to negative at a predetermined point of its characteristic, that is, the point where the coefficient of expansion $\beta(\tau)$ is zero, and maintaining the temperature at or near the zero crossing point. As a result, the change in length of the cavity, and hence the change in its resonant frequency, becomes proportional to the square of the temperature change, rather than directly proportional, whereby over a small region around the zero crossing point the variation of size with temperature will be considerably reduced. In addition by choosing a material for the cavity having a zero crossing point at a temperature which is at or near the temperature at which a second material changes its physical state, e.g., from solid to gaseous state, and packing the second material around the cavity, then a simple mode of temperature stabilization is provided. In the present case, for example, the cavity material used is fused quartz, which happens to have a zero crossing point at the temperature of Dry Ice. By placing the cavity in a container of Dry Ice, the continuous sublimation of the Dry Ice will maintain the cavity at the zero crossing point, as long as the Dry Ice lasts.

The second object is attained by providing a flexible spring-biased connection between the waveguide and the cavity.

The features of the invention which are believed to be novel are set forth with particularity in the appended claims. The invention itself, however, both as to its organization and method of operation, together with further objects and advantages thereof, may best be understood by reference to the following description taken in conjunction with the accompanying drawing, in which:

Figure 1 is a cross section of a microwave cavity built in accordance with the invention;

Figure 2 is a cross section taken along line 2—2 of Figure 1; and

Figure 3:
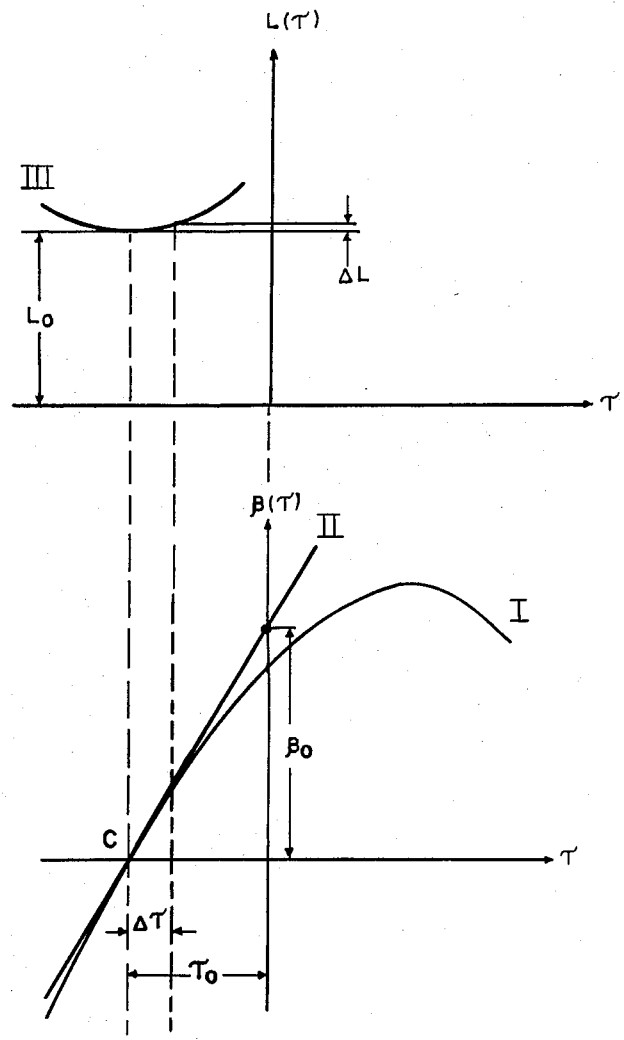
Figure 3 is series of curves illustrating the operating characteristics of the invention.

Figure 1 shows a cylindrical cavity resonator 10 of a maser. The resonator is made of fused quartz having a silver coating 12 on the inside thereof to render it conductive. The thickness of this coating is equal to the thickness of penetration of the frequencies used.

On opposite ends of the cavity are short pieces of cut-off wave guides 14 and 16, also made of fused quartz and silver coated on the inside. The inner diameters of these wave guides are of smaller diameter so that they are at cut-off to the frequencies involved, and at the same time provide openings for the passage of the molecular beam into and out of the cavity.

In accordance with this invention, advantage is taken of the fact that quartz has a temperature coefficient of expansion which goes through zero at a predetermined temperature. Hence by maintaining the cavity at said predetermined temperature, changes in length, and hence resonant frequency, of the cavity will be proportional largely to the square of the temperature change, whereby for small range of temperature variation in the region of the crossing point the change in length for a given change in temperature will be smaller than if the variation were a linear function.

This predetermined temperature happens to be very near the temperature of Dry Ice. Hence a simple temperature control device can be made in the form of a container 18 filled with Dry Ice or a solution of Dry Ice in alcohol. Thus, at temperatures above the freezing point of carbon dioxide, the continuous evaporation of the Dry Ice will maintain the cavity at the zero crossing point temperature as long as the Dry Ice lasts.

The manner in which the above structure functions will be clear from a consideration of Figure 3. The curve I shows the variation of the coefficient of expansion $\beta$ with temperature $\tau$ and having a zero crossing point temperature at point C. The equation of this curve is:

$$\beta(\tau) = \frac{1}{L_0} \cdot \frac{dL(\tau)}{d\tau}$$

where $L_0$ is the length of the cavity at the zero crossing point, and $L(\tau)$ is the length of the cavity at any temperature.

It will be noted that curve I in the region of the zero crossing point has a very small curvature, whereby any point on curve I in that region may be approximated by an extension of the ordinate of that curve to the tangent II. Hence, to a first approximation:

$$\frac{\Delta L}{L} = \int_0^{\Delta \tau} \left(\frac{\beta_0}{\tau_0}\right) \Delta \tau \, d(\Delta \tau) = \frac{\beta_0}{2\tau_0}(\Delta \tau)^2$$

If we let A equal $\beta_0/\tau_0$, then $$\frac{\Delta L}{L} = \frac{A}{2}(\Delta \tau)^2 = -\frac{\Delta f}{f}$$

where $f$ is the resonant frequency of the cavity. This relationship is illustrated by curve III.

Thus it will be seen that at the zero crossing point the relative change in resonant frequency is proportional to the square of the temperature change. In the case of fused quartz, A equals $6(10^{-9})T^{-2}$, where T is the temperature in degrees centigrade. If the temperature is automatically kept within $\pm 3°$ centigrade of the crossing point temperature, the maximum relative frequency shift $\Delta f/f$ of the cavity will be approximately equal to $-3(10^{-8})$, and this will result in a frequency shift of a maser of $-3(10)^{-11}$ if all other frequency affecting influences are constant.

To adjust the initial resonant frequency of the cavity, a small quartz rod 22 can be introduced into the cavity through an aperture therein. The range of tuning should be small in order to maintain the inherent stability of the arrangement.

The energy from the cavity is transmitted by means of a rectangular K-band wave guide 24 of brass or other suitable metal. Energy is transmitted into the wave guide through an aperture 26 in the cavity which communicates with a smaller aperture 28 in the end of the wave guide.

To compensate for differences in expansion due to temperature changes, since different materials are involved, wave guide 24 is coupled to cavity 10 by means of a spring biased coupling device. For this purpose, parallel slots 30 and 32 are formed on opposite sides of the cavity at the center thereof. Filling these slots are a pair of segmentally-shaped brass inserts 34 and 36. The inner sides of these inserts are flat and in snug contact with the bottoms 38 and 40 of the parallel slots 30 and 32 of the cavity.

Wave guide 24 passes through an aperture centrally disposed in insert 34 and is soldered thereto. Since wave guide 24 is rectangular, insert 24 can be formed by making it in two pieces and soldering them to the wave guide on opposite sides thereof. The outer contours 42 and 44 of the inserts are circular in shape and lie on a circle which is somewhat larger than the outer diameter of the cavity. Surrounding the inserts on opposite sides of the wave guide 24 are a pair of split resilient metal rings 46 and 48 each having a split 50 therein. On opposite sides of the split in each ring are formed aligned notches in which are positioned the converging resilient arms of a spring plate 56 which tends to contract rings 46 and 48 so that they hold inserts 34 and 36 tightly against the bottoms of slots 30 and 32 regardless of the differences in the amount of expansion of the metal and quartz portions of the wave guide. Thus the pressure on the cavity and the coupling between the cavity and the wave guide are kept more constant over a large range of temperatures.

Although the invention has been described with regard to stabilization of the dimensions of a cavity resonator, it is equally applicable to other structures both electrical and non-electric. It will be obvious to those skilled in the art that various changes and modifications may be made therein without departing from the invention; and it is aimed in the appended claims to cover all such changes and modifications as fall within the true spirit and scope of the invention.

What is claimed is:

1. A temperature-stable resonant structure comprising a cavity resonator element made of fused quartz having a metallic coating therein to render it conductive, and a container of Dry Ice to receive said resonator element with the Dry Ice in heat exchange relation therewith.

2. A structure as set forth in claim 1, including a metallic wave guide communicating with an aperture in the wall of said cavity resonator, and a resilient means for clamping said resonator to said wall to maintain a more constant coupling between said wave guide and resonator regardless of difference in their coefficients of expansion.

3. A structure as set forth in claim 1, including a slot in the outer wall of said resonator, a rectangular metallic wave guide extending into said slot and communicating with an aperture in the wall of said resonator, and resilient means in said slot for elastically maintaining said wave guide coupled to said resonator to compensate for the difference in coefficients of expansion of said resonator and wave guide.

4. A structure as set forth in claim 3, wherein the last named means comprises a metallic insert member in said slot to which said wave guide is fused, and said resilient means is a split resilient ring encircling said insert member and said resonator.

5. In combination, a cavity resonator of fused quartz, a first slot on the outer surface of said resonator, a first metallic insert member in one of said slots, a metallic wave guide fused to and extending through said insert member and communicating with an aperture extending from the bottom of said slot into the interior of said resonator, said wave guide and resonator having different coefficients of expansion, a second slot on said body opposite said first slot, an insert in said second slot, the outer contours of both inserts being circular and lying on a circle having a diameter which is larger than the width of said resonator, and a pair of split resilient rings encircling both inserts on either side of said wave guide, resilient spring means fastened to the ends of both rings and tending to maintain the latter in tight engagement with said inserts and to maintain such engagement during temperature changes a quantity of Dry Ice and means to hold the Dry Ice in heat exchange relation with said resonator.

6. In combination a cavity resonator of fused quartz having the inside thereof coated with a conductive substance, a slot in the outer wall of said resonator, a metallic wave guide extending into said slot and communicating with the inside of said resonator, resilient means in said slot for elastically maintaining said wave guide coupled to said resonator to compensate for the difference in coefficients of expansion of said resonator and wave guide, a quantity of Dry Ice and means to hold the Dry Ice in heat exchanging relation to said resonator.

7. The combination as set forth in claim 6, wherein the last named means comprises a metallic insert member in said slot to which said wave guide is fused, and said resilient means is a split resilient ring encircling said insert member and said resonator.

8. In combination, a cylindrical cavity resonator having a body of fused quartz having a metallic coating on the inside thereof, a first slot on the outer surface of said body, a first brass insert member in said slot, a brass wave guide soldered to and extending through said insert member and communicating with an aperture extending from the bottom of said slot into the interior of said body, a second slot on said body diametrically opposite said first slot and parallel thereto, a brass insert in said second slot, the outer contours of both inserts being circular and lying on a circle having a diameter which is larger than said cavity resonator, a pair of split resilient rings encircling both inserts on either side of said wave guide, resilient spring means fastened to the ends of both rings and tending to maintain the latter in tight engagement with said inserts during temperature changes a quantity of Dry Ice and means to hold the Dry Ice in heat exchange relation to said resistor.

References Cited in the file of this patent

UNITED STATES PATENTS

| | | |
|---|---|---|
| 1,962,210 | Osnos | June 12, 1934 |
| 2,281,247 | Peterson | Apr. 28, 1942 |
| 2,434,255 | Bond | Jan. 13, 1948 |
| 2,626,316 | Gibson | Jan. 12, 1953 |